United States Patent
Lin et al.

(10) Patent No.: US 12,249,043 B2
(45) Date of Patent: Mar. 11, 2025

(54) IMAGE NON-UNIFORMITY MITIGATION SYSTEMS AND METHODS

(71) Applicant: Teledyne FLIR Commercial Systems, Inc., Goleta, CA (US)

(72) Inventors: Stephanie Lin, Buellton, CA (US); Dylan M. Rodriguez, Goleta, CA (US); Joseph Kostrzewa, Santa Ynez, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 414 days.

(21) Appl. No.: 17/573,553

(22) Filed: Jan. 11, 2022

(65) Prior Publication Data
US 2022/0261964 A1    Aug. 18, 2022

Related U.S. Application Data

(60) Provisional application No. 63/149,210, filed on Feb. 12, 2021.

(51) Int. Cl.
*G06T 5/00* (2024.01)
*G06T 3/40* (2024.01)

(52) U.S. Cl.
CPC ............ *G06T 5/00* (2013.01); *G06T 3/40* (2013.01); *G06T 2207/10048* (2013.01); *G06T 2207/20132* (2013.01)

(58) Field of Classification Search
CPC ... G06T 5/00; G06T 3/40; G06T 2207/10048; G06T 2207/20132; H04N 17/002; H04N 25/671; H04N 25/673; H04N 5/33; H04N 23/80
See application file for complete search history.

(56) References Cited

U.S. PATENT DOCUMENTS

| | | | |
|---|---|---|---|
| 9,143,709 B1 | 9/2015 | Winn | |
| 10,986,288 B2 * | 4/2021 | Kostrzewa | ............... H04N 5/33 |
| 12,046,445 B2 * | 7/2024 | Nagao | ..................... G06T 7/001 |

(Continued)

FOREIGN PATENT DOCUMENTS

| | | | |
|---|---|---|---|
| WO | WO 2014/143338 | 9/2014 | |
| WO | WO-2019023497 A1 * | 1/2019 | ........... H04N 17/002 |

OTHER PUBLICATIONS

Lee et al. "An Iterative Method for Flat-field Correction of Digital Radiography When Detector is at Any Position," Proceedings of SPIE, vol. 5745, Apr. 15, 2005, Bellingham, WA, pp. 1025-1029.

*Primary Examiner* — Chan S Park
*Assistant Examiner* — D J Dhooge
(74) *Attorney, Agent, or Firm* — Haynes and Boone, LLP

(57) ABSTRACT

Techniques for facilitating non-uniformity mitigation for imaging systems and methods are provided. In one example, a method includes cropping an image based on a defect in the image to obtain a cropped image. The method further includes cropping a supplemental flat field correction (SFFC) map based on the defect in the image to obtain a cropped SFFC map. The method further includes determining a scaling value of a scaling term based at least on a cost function. The method further includes scaling the SFFC map based on the scaling value to obtain a scaled SFFC map. Related devices and systems are also provided.

20 Claims, 7 Drawing Sheets

(56) References Cited

U.S. PATENT DOCUMENTS

| | | | |
|---|---|---|---|
| 2005/0046584 A1* | 3/2005 | Breed | G06F 3/0237 |
| | | | 340/13.31 |
| 2016/0171697 A1 | 6/2016 | Paliy et al. | |
| 2017/0142312 A1* | 5/2017 | Dal Mutto | H04N 13/254 |
| 2017/0195584 A1* | 7/2017 | Kostrzewa | H04N 23/54 |
| 2018/0276803 A1 | 9/2018 | Lee et al. | |
| 2019/0342480 A1* | 11/2019 | Kostrzewa | H04N 5/33 |
| 2020/0005440 A1 | 1/2020 | Sanchez-Monge et al. | |

* cited by examiner

IMAGE NON-UNIFORMITY MITIGATION SYSTEMS AND METHODS

CROSS-REFERENCE TO RELATED APPLICATIONS

This application claims the benefit of and priority to U.S. Provisional Patent Application No. 63/149,210 filed Feb. 12, 2021 and entitled "IMAGE NON-UNIFORMITY MITIGATION SYSTEMS AND METHODS," which is incorporated herein by reference in its entirety.

TECHNICAL FIELD

One or more embodiments relate generally to imaging and more particularly, for example, to image non-uniformity mitigation systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes cropping an image based on a defect in the image to obtain a cropped image. The method further includes cropping a supplemental flat field correction (SFFC) map based on the defect in the image to obtain a cropped SFFC map. The method further includes determining a scaling value of a scaling term based at least on a cost function. The method further includes scaling the SFFC map based on the scaling value to obtain a scaled SFFC map.

In one or more embodiments, a system includes a memory configured to store an SFFC map. The system further includes a processing circuit configured to crop an image based on a defect in the image to obtain a cropped image and crop the SFFC map based on the defect in the image to obtain a cropped SFFC map. The processing circuit is further configured to determine a scaling value of a scaling term based at least on a cost function. The processing circuit is further configured to scale the SFFC map based on the scaling value to obtain a scaled SFFC map.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
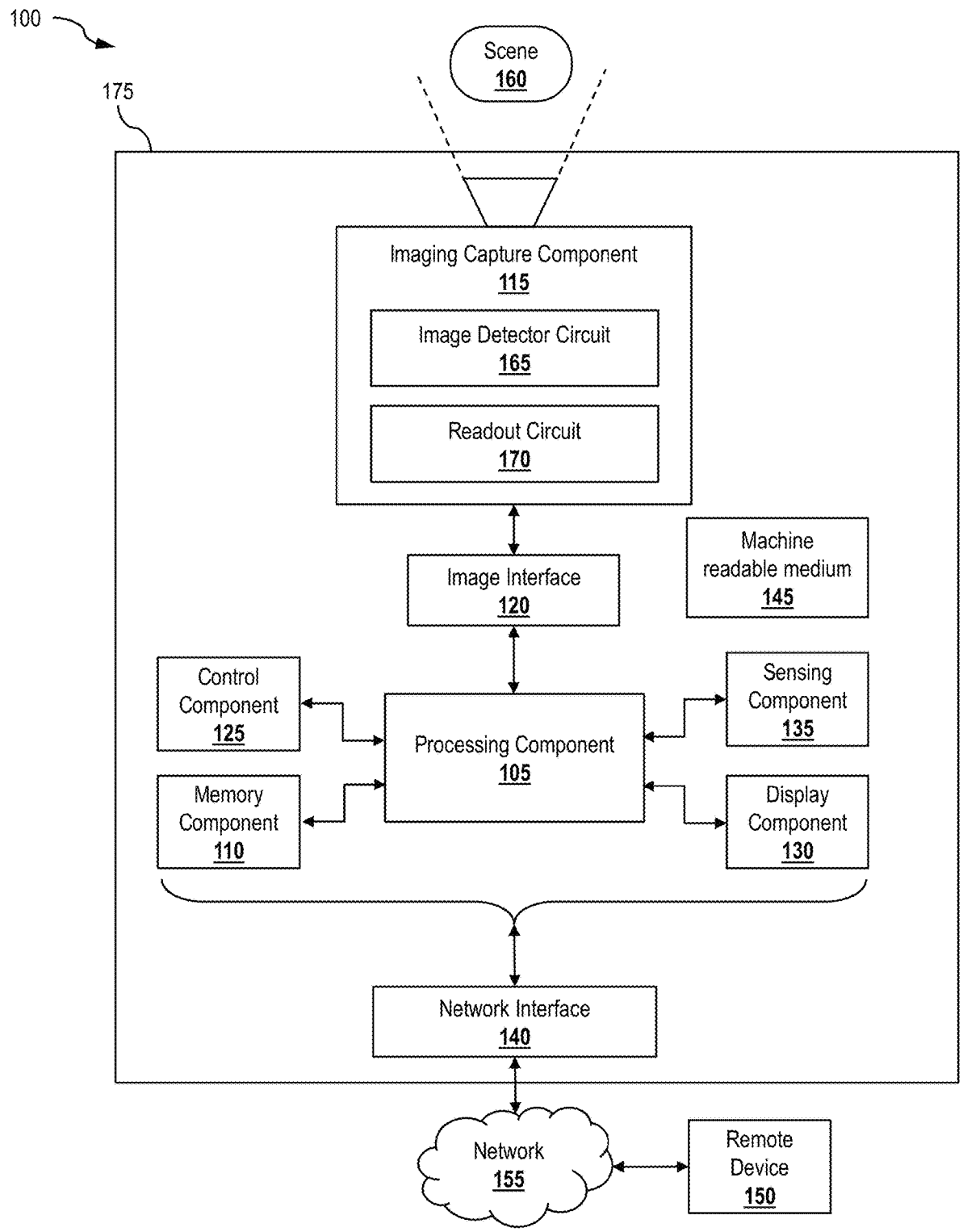
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate non-uniformity mitigation in images. In some embodiments, an imaging system includes a detector array and a readout circuit. The detector array includes detectors (e.g., also referred to as detector pixels, detector elements, or simply pixels). Each detector pixel detects incident EM radiation and generates image data (e.g., infrared image data) indicative of the detected EM radiation of a scene. In some embodiments, the detector array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C.

In some embodiments, scene non-uniformities in an image, such as those associated with defects in an optical path to a detector array, are mitigated (e.g., reduced or eliminated) by applying a scaled supplemental flat field correction (SFFC) map (e.g., also referred to as an SFFC image) to the image. The SFFC map includes SFFC values. In some cases, the defects may include defect or debris of an imaging system, such as on wafer-level packaged sensors. Such defects may be on a lid, a window, or other component of the imaging system in a field of view of an FPA. As one example, in some cases, a lid may be close to the FPA, with any defects of the lid having good focus as a result of the proximity. As other examples, defects on an inner surface of a window tend to be closer to the FPA and more in focus, and thus generally appear smaller but intense, whereas defects on an outer surface of the window are generally larger but more diffused. Such defects are generally non-uniformities that may span several pixels of the FPA in diameter and may be detectable in the SFFC map. Such defects associated with an FPA generally remain constant in location and thus are consistently present in images captured by the FPA. In some cases, an SFFC map may be flattened. For some images and/or imaging systems, flattening an SFFC map may help isolate defects. A flattened SFFC map may be obtained from an SFFC map by downsampling/upsampling the SFFC map and subtracting off the SFFC map to provide the flattened SFFC map. In other cases, the SFFC map is not flattened (e.g., flattening is not helpful for isolating defects).

The scaled SFFC map may be obtained by applying a scaling term P to an SFFC map. In some embodiments, determining of a value of the scaling term P leverages a cost function. In this regard, the cost function is a function of P and may be represented as FVAL(P). The value may be a scalar value (e.g., also referred to as a scaling value or scaling factor). The cost function may provide a representation (e.g., mathematical representation) of a quality associated with the image. In an aspect, a minimization process (e.g., iterative minimization process) may be performed to minimize the cost function (e.g., to approach a higher quality image) to allow convergence of the value of the scaling term P to apply to the SFFC map. In an aspect, P may refer to the scaling term P or a value of the scaling term P. The scaled SFFC map may then be applied to an image to obtain a corrected image (e.g., a non-uniformity corrected image).

In some aspects, the scaling term P may be determined based on a portion of an image. In some aspects, although determined based on a portion of an image, the scaling term P may be applied to the entire image to correct non-uniformity in the entire image. Such application of a locally determined scaling term on the entire image may reduce computational complexity and/or computation time. In an aspect, the portion of the image may encompass a defect captured in the image. In some cases, this defect may be a defect considered to be a worst defect represented in the image. This value of the scaling term P may be applicable to mitigate the worst defect as well as other defects in the image. The defects (e.g., including the worst defect) in an image may be determined/identified by a user of an imaging system (e.g., via visual inspection of the image by the human eye) and/or a machine. In some cases, a user and/or a machine may determine the worst defect based on a size of the defect and/or an intensity of the defect in the image.

In some embodiments, an image processing pipeline may be divided into a main processing path and a background processing path. Operations of the main processing pipeline may include processing performed on the images or video as they are recorded and stored in a data storage. The main processing path may include capturing an image, applying a scaling term P to an SFFC map to obtain a scaled SFFC map, and applying the scaled SFFC map to the image. In some cases, the scaling term P may be dampened in the main processing path. In some cases, when capturing an input image, a gain used to apply SFFC at that moment in time may be captured. The main processing path may also include operations such as automatic gain control, other types of noise suppression, gain and offset adjustment, spatial filtering, temporal filtering, radiometry conversions (e.g., for infrared images), and/or other operations to generate suitable image data for displaying, storage, and/or further processing. The background processing path may perform a minimization search to find a value of the scaling term P for the image and associated operations (e.g., cropping an image and an SFFC map for use in a cost function and computing gradients). Operations of the background processing path may be performed outside of the main processing path to avoid causing interruption or delay to image or video recording. In some embodiments, the scaling term may be determined per frame (e.g., in real time) rather than as a background process.

Although various embodiments for non-uniformity mitigation are described with respect to infrared imaging (e.g., thermal infrared imaging), non-uniformity mitigation may be applied to image data of other wavebands. Various embodiments of methods and systems disclosed herein may be included in or implemented as various devices and systems such as visible-light imaging systems, infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera, a tablet computer, a laptop, a personal digital assistant (PDA), a mobile device, a desktop computer, or other electronic device) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various image components of the imaging system 100) and other image processing operations (e.g., data conversion, video analytics, etc.).

In some cases, the processing component 105 may perform operations such as non-uniformity correction (NUC) (e.g., flat field correction (FFC) or other calibration technique), spatial and/or temporal filtering, and/or radiometric conversion on the pixel values. As an example, an FFC calibration process (e.g., also referred to as an FFC event) may generally refer to a calibration technique performed in digital imaging to remove artifacts from frames that are caused by variations in pixel-to-pixel output of an image detector circuit 165 (e.g., variations between individual microbolometers of the image detector circuit 165) and/or by distortions in an optical path. In one case, the imaging system 100 may include an internal structure (e.g., shutter, lid, cover, paddle) to selectively block the image detector circuit 165. The structure may be used to provide/present a uniform scene to the detectors of the image detector circuit 165. The detectors are effectively blinded from the scene. In an aspect, the FFC event may involve capturing and averaging multiple frames while a shutter of the imaging system 100 is in a closed position to cover the image detector circuit 165, such that the image detector circuit 165 captures image data of the structure and is blind to the scene. In another case, the FFC event may include use of an external FFC source, with corrections applied to captured image data such that radiometric data in the images are correct when viewing the external FFC source. In general, the internal FFC source and/or external FFC source is at an accurately known temperature. Captured frames of the internal source (e.g., internal structure) and/or external source are accumulated and utilized to update FFC correction terms to be applied to frames output by a readout circuit 170 (e.g., by a processing circuit of the imaging system 100 that receives frames output by the readout circuit 170) and are generally not provided as an output of the imaging system 100. In some cases, calibration events may be performed periodically and/or upon user command.

In some aspects, the FFC values may be used to correct for non-uniformities associated with various optical paths of the imaging system 100. SFFC values may also be determined and applied to image data to further correct for such non-uniformities. Examples of systems and methods for determining FFC values and/or SFFC values and related operations are provided in U.S. Patent Application Publication Nos. 2020/0005440 and 2020/0154063, which are incorporated herein by reference in their entireties.

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. In one or more embodiments, such instructions, when executed by the processing component 105, may cause the imaging system 100 to perform operations to generate scaling terms and mitigate non-uniformities. The processing component 105 and/or the image interface 120 may be configured to store in the memory component 110 images or digital image data captured by the image capture component 115. The processing component 105 may be configured to store FFC values, SFFC values, processed (e.g., non-uniformity corrected) still and/or video images, and/or other data in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes the image detector circuit 165 (e.g., a thermal infrared detector circuit) and the readout circuit 170 (e.g., an ROIC). For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible-light, ultraviolet light, and so forth.

The image detector circuit 165 may capture image data (e.g., infrared image data) associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. In an embodiment, the image detector circuit 165 may receive energy flux (e.g., thermal infrared energy flux) from an object(s) in the scene 160 and convert the energy flux to data values indicative of temperatures of the object(s) in the scene 160. The imaging system 100 may be radiometrically calibrated to ensure accurate conversion from the amount of energy received by the image detector circuit 165 to the data values generated by the image detector circuit 165. In some cases, an uncertainty factor may be based on parameters associated with the flux-to-temperature conversion.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values. In an embodiment, the image may be a thermal infrared image (e.g., also referred to as a thermal image) based on thermal infrared image data. Each pixel value of the thermal infrared image represents a temperature of a corresponding portion of the scene 160.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

For infrared imaging, characteristics associated with the image detector circuit 165 (and its associated ADC circuit if any) may include, by way of non-limiting examples, a dynamic range, a minimum temperature that can be reliably represented, a maximum temperature that can be reliably represented, and a sensitivity. The dynamic range may be, or may be indicative of, a range (e.g., difference) between the minimum temperature and the maximum temperature that can be captured by the image detector circuit 165 and represented in an infrared image. In this regard, areas of the scene 160 that are below the minimum temperature may be buried in a noise floor of the imaging system 100 and appear washed out and/or noisy in the IR image. Areas of the scene 160 above the maximum temperature cause saturation in the infrared image, in which the areas that are saturated are represented in the same manner (e.g., using the same color value or the same grayscale value) as areas at the maximum temperature. For example, when the image detector circuit 165 generates digital count values using an ADC circuit, temperatures at or above the maximum temperature may all be mapped to the highest value that can be represented by the ADC circuit (e.g., 16,383 for a 14-bit ADC circuit), and temperatures at or below the minimum temperature may all be mapped to the lowest value (e.g., 0) that can be represented by the ADC circuit. In other words, the infrared image does not distinguish between areas above the maximum temperature and areas at the maximum temperature and does not distinguish between areas below the minimum temperature and areas at the minimum temperature.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. In an aspect, the image interface 120 may include a serial interface and telemetry line for providing metadata associated with image data. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

The image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
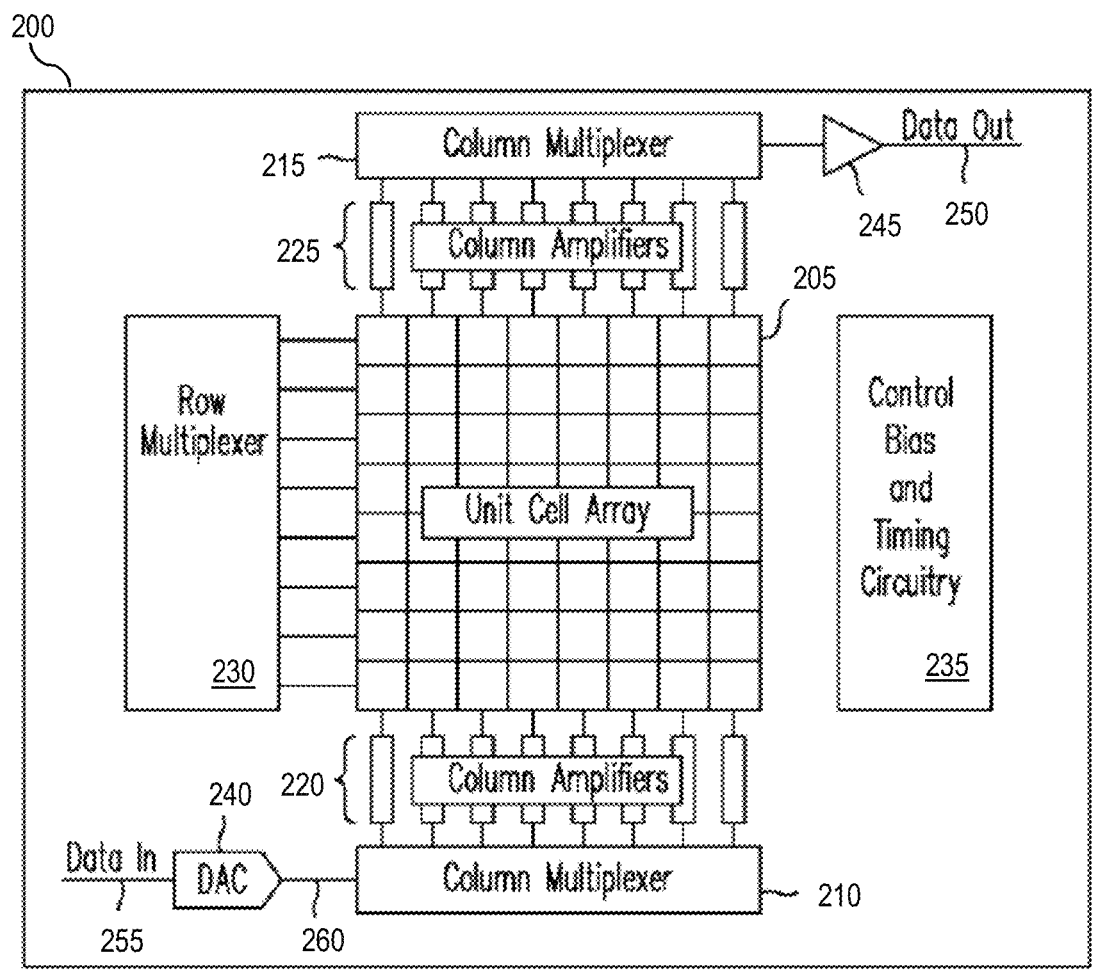
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die. In an embodiment, components of the image sensor assembly 200 may be implemented such that the unit cell array 205 is hybridized to (e.g., bonded to, joined to, mated to) the ROIC. An example of such a hybridization is described with respect to FIG. 3.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or image capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., FFC or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
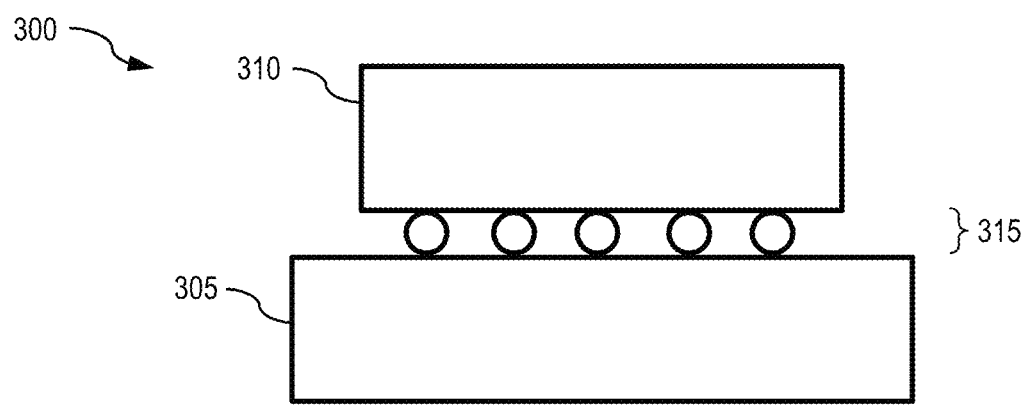
FIG. 3 illustrates an example image sensor assembly in accordance with one or more embodiments of the present disclosure.

In some embodiments, components of the image sensor assembly 200 may be implemented such that a detector array (e.g., array of infrared detectors such as microbolometers) and a readout circuit may be part of a single die. In other embodiments, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). As an example, the detectors may be InGaAs-type detectors. The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

Figure 4:
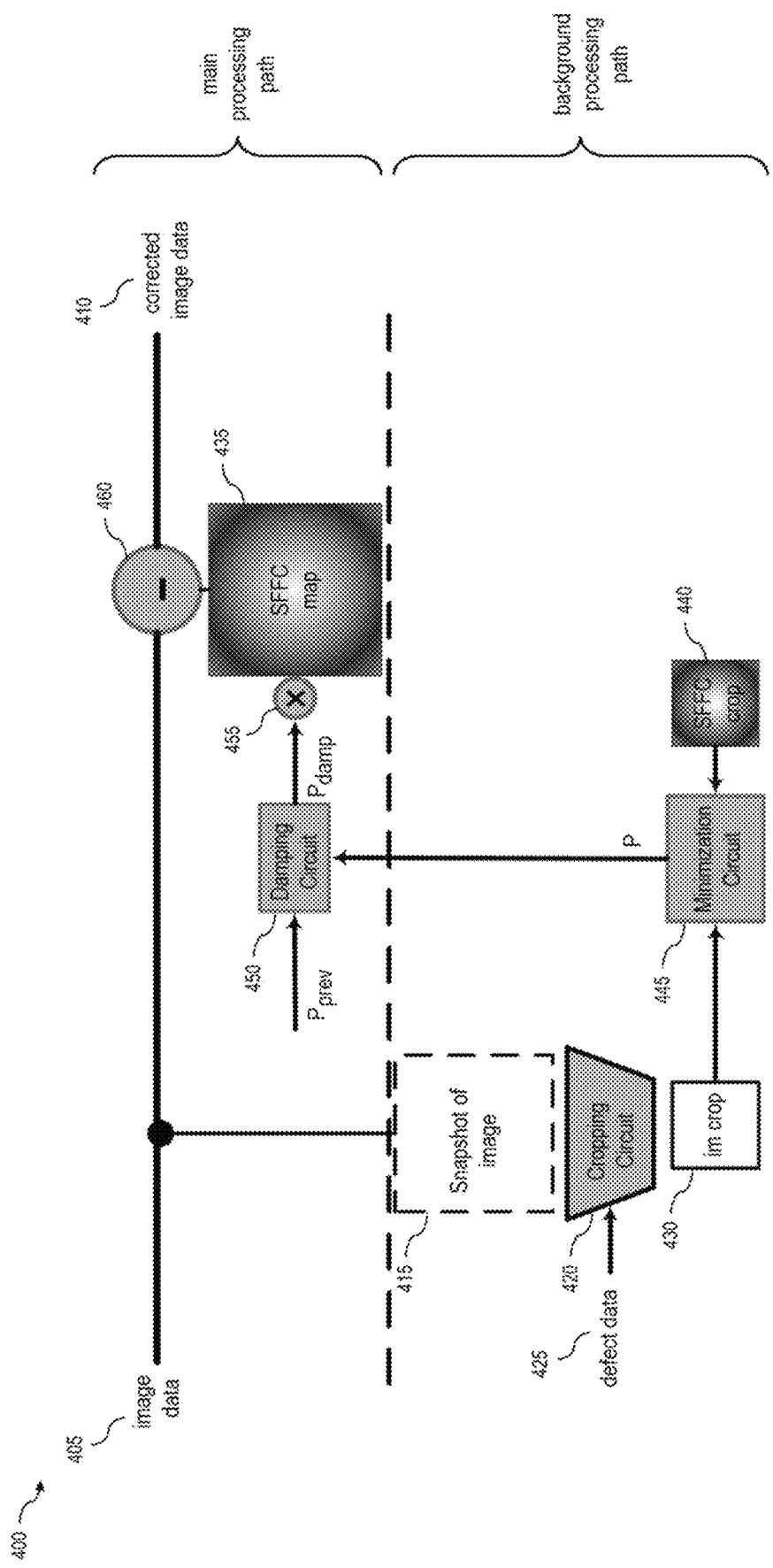
FIGS. 4 and 5 illustrate example systems for facilitating image non-uniformity mitigation in accordance with one or more embodiments of the present disclosure.

FIG. 4 illustrates an example system 400 for facilitating image non-uniformity mitigation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

In the system 400, a main processing path involves performing non-uniformity correction on image data 405 to obtain corrected image data 410 (e.g., non-uniformity corrected image data). The image data 405 and the corrected image data 410 may each include images. In some cases, the image data 405 may include images to which gain and/or offset have been applied and, as such, the image data 405 may be referred to as post gain/offset image data.

An image 415 of the image data 405 may be provided to a background processing path. The image 415 may be referred to as a snapshot of the image data 405. In some cases, a tapping circuit may trigger (e.g., periodically, aperiodically, and/or in response to user input) the snapshot and/or tap to obtain the snapshot. A cropping circuit 420 receives the image 415 and crops the image 415 based on defect data 425 to obtain a cropped image 430. The defect data 425 may include data indicative of a location, a size, and/or other data pertaining to a defect in the image 415. In an aspect, a defect may be determined/identified by a user of the imaging system 100 (e.g., via visual inspection by the human eye) and/or a machine. In an embodiment, the defect data 425 may pertain to a defect identified as a worst defect in the image 415. For example, a user and/or a machine may determine the worst defect based on a size of the defect and/or an intensity of the defect in the image. In some aspects, the cropped image 430 is larger than and encompasses a defect (e.g., the worst defect) in the image 415. In some cases, such as when the cropping circuit 420 generates cropped images of a fixed size and/or a maximum size that is smaller than a size of a defect, a cropped image may encompass a portion of a defect.

A portion of an SFFC map 435 that corresponds to the cropped image 430 (e.g., in size, location, and shape of the cropped image 430 relative to the image 415) is cropped out to provide a cropped SFFC map 440. In some cases, an image tap may be available for the SFFC map 435 and/or the cropped SFFC map 440, such as for testing/troubleshooting purposes. By way of non-limiting examples, the cropped image 430 and the cropped SFFC map 440 may be 32 pixels×32 pixels, 64 pixels×64 pixels, 32 pixels×64 pixels, or other size. The cropped image 430 and the cropped SFFC map 440 may be of other sizes and/or shapes (e.g., non-rectangular maps/images).

A minimization circuit 445 receives the cropped image 430 and the cropped SFFC map 440 and iteratively adjusts a scalar value P to minimize a cost function FVAL(P). In an embodiment, the cost function may be provided by:

$$FVAL(P) = \text{mean}\left(\sqrt[2]{grad(im_{cropped} - P \times NU)}\right)^2$$

where $im_{cropped}$ is the cropped image 430 and NU (e.g., a non-uniformity estimate) is the cropped SFFC map 440. The $im_{cropped} - P \times NU$ may be referred to as a corrected image (e.g., also referred to as a non-uniformity corrected image, cleaned image, corrected/cleaned cropped image or corrected/cleaned image portion) and is formed by subtracting the cropped SFFC map 440 (after scaling by the scaling term P) from the cropped image 430. In some cases, $im_{cropped}$ and P×NU may be normalized to a range of 0 to 1, inclusive.

In an aspect, the minimization circuit 445 may determine the value for the scaling term P that minimizes the cost function based on a Nelder-Mead scalar minimization technique. In an aspect, other nonlinear direct-search minimization approaches, such as a coordinate descent approach, particle swarm optimization approach, and so forth may be utilized. Other embodiments may utilize other minimization/optimization processes to determine the value of the scaling term P that minimizes the cost function. The minimization/optimization processes utilized to determine the scalar value P may be selected based on computational complexity, computation time, efficiency, and/or other considerations.

For the cost function FVAL(P) provided above, $x=im_{cropped} - P \times NU$ in which grad(x), $\Delta_1(x)$, and $\Delta_2(x)$ are arrays having the same size as the cropped image 430 and the cropped SFFC map 440. A gradient of an array x may be provided by $grad(x) = \Delta_1(x)^2 + \Delta_2(x)^2$. In an aspect, for each line of an array x, the functions $\Delta_1(x)$ and $\Delta_2(x)$ may take the line (e.g., row or column) of the array x and subtract it from another line of the array x, or vice versa. In one example, $\Delta_1(x)$ may occur in a vertical direction in which every row of the array x is subtracted from two rows over (e.g., pixels of row 3 minus pixels of row 1, pixels of row 4 minus pixels of row 2, pixels of row 5 minus pixels of row 3, etc.), and/or $\Delta_2(x)$ may occur in a horizontal direction in which every column of the array x is subtracted from two columns over (e.g., pixels of column 3 minus pixels of column 1, pixels of column 4 minus pixels of column 2, pixels of column 5 minus pixels of column 3, etc.). It is noted that the subtraction need not be of lines spaced apart by two (e.g., need not be line 3 minus line 1). For example, the lines that are subtracted from each other may be spaced apart by three or more. Other manners by which to determine a gradient associated with an array x may be used.

The value of the scaling term P may be iteratively adjusted and the corresponding cost function FVAL(P) computed to obtain (e.g., converge toward) a value of P that minimizes the cost function FVAL(P). Under this iterative approach, the cropped SFFC map 440 is fixed whereas the value of the scaling term P is iteratively updated. Each update includes an adjustment of P. In some cases, P may continue to be adjusted up to a fixed number of iterations. In some cases, the updating of P may be repeated as many times as needed (e.g., until a condition is satisfied). For example, the updating may be repeated until the cost function is not reduced or is insufficiently reduced after a few adjustments to P. In some cases, the value of the scaling term P at one or more of the iterations may be available to read, such as for applying to image data and/or for testing/troubleshooting purposes.

In some cases, the value for the scaling term P determined to minimize the cost function may be performed within a frame time (e.g., such that the value may be applied to the image 415) or may span multiple frames. In some cases, when the value for the scaling term P determined to minimize the cost function takes multiple frames to determine, a previously determined value for the scaling term may continue to be used until the minimization process is complete. Computation time associated with the minimization process may be based at least on a size of the cropped image 430, the cropped SFFC map 440, and any terminal conditions associated with the minimization process. In an embodiment, the scaling term may be determined per frame (e.g., in real time) or periodically (e.g., in the background).

A damping circuit 450 receives, from the minimization circuit 445, the value of the scaling term P that minimizes (e.g., according to a desired termination condition) the cost function FVAL(P). The damping circuit 450 also receives a previous value $P_{prev}$ of the scaling term. As an example, the previous value $P_{prev}$ may be a value for the scaling term generated by the minimization circuit 445 based on a snapshot from the image data 405 received by the background processing path prior to receipt of the image 415. As another example, the previous value $P_{prev}$ may be a value obtained for the scaling term during a previous iteration of adjusting the scaling term (e.g., before the minimization process to determine the P that minimizes the cost function is complete), such that this previous value is based on the image 415. The damping circuit 450 generates a damped scaling term $P_{damp}$ based at least on P and $P_{prev}$. In an aspect, damping of the scaling term P in the main process path avoids sudden shifts in imagery due to adjustment of the value of the scaling term P. The damping circuit 450 may generate the damped scaling term $P_{damp}$ by applying a damping factor (e.g., temporal damping factor) to the scaling term P.

In some cases, the damping term may be implemented using alpha blending, infinite impulse response (IIR) filtering, and/or other damping technique. The damping term may be based on a linear combination (e.g., weighted average) of a value of the scaling term P at a current time and one or more values of the scaling term P determined at times prior to the current time. The damping term may be utilized to minimize relatively large and/or quick fluctuations associated with applied scaling terms P. Different imaging systems and/or components thereof may be associated with a different damping term.

A combiner circuit 455 receives the damped scaling term $P_{damp}$ and applies the damped scaling term $P_{damp}$ to the SFFC map 435 to obtain a scaled SFFC map. The combiner circuit 455 may multiply the SFFC map 435 with the damped scaling term $P_{damp}$. A combiner circuit 460 receives the image data 405 in the main processing path and applies the scaled SFFC map to an image of the image data 405. In one case, the image to which the damped scaling term $P_{damp}$ may be the image 415 and/or one or more images captured subsequent to the image 415 used to generate the scaling term P (from which $P_{damp}$ is determined). The combiner circuit 460 may subtract the scaled SFFC map from this image to obtain a corrected image (e.g., a non-uniformity corrected image) that forms a part of the corrected image data 410.

In some cases, the corrected image data 410 may be further processed along the main processing path. In some cases, the further processing may include spatial filtering operations and/or temporal filtering operations. In one aspect, the spatial filtering may apply spatial filter parameters to the corrected image data 410. The temporal filtering may receive pixel values output from the spatial filtering and perform temporal filtering on the pixel values in the temporal domain based on temporal filter parameters and data associated with a previous image(s). In some cases, the temporal filtering may occur prior to the spatial filtering. In some cases, the spatial filtering and the temporal filtering may occur together, rather than as two discrete, sequential filtering operations. Other and/or alternative operations may be performed to obtain the image data 405 and/or the corrected image data 410 and/or to further process the corrected image data 410.

In some embodiments, the processing component 105 may select an image on a per frame basis (e.g., in real time), periodically (e.g., every 100 images received, every few minutes, every hour, etc.), aperiodically (e.g., based on image quality and/or in response to user request for a calibration) to determine a scaling term P in the background process. For example, a user and/or a machine may indicate or request a new scaling term P to be determined if defects are located in images to which a previous scaling term is applied. Once a scaling term P is determined, the scaled non-uniformity estimation may be applied to the images received as part of the main processing path. In some cases/applications, determining P may be a part of the main processing path and performed on each frame.

Figure 5:
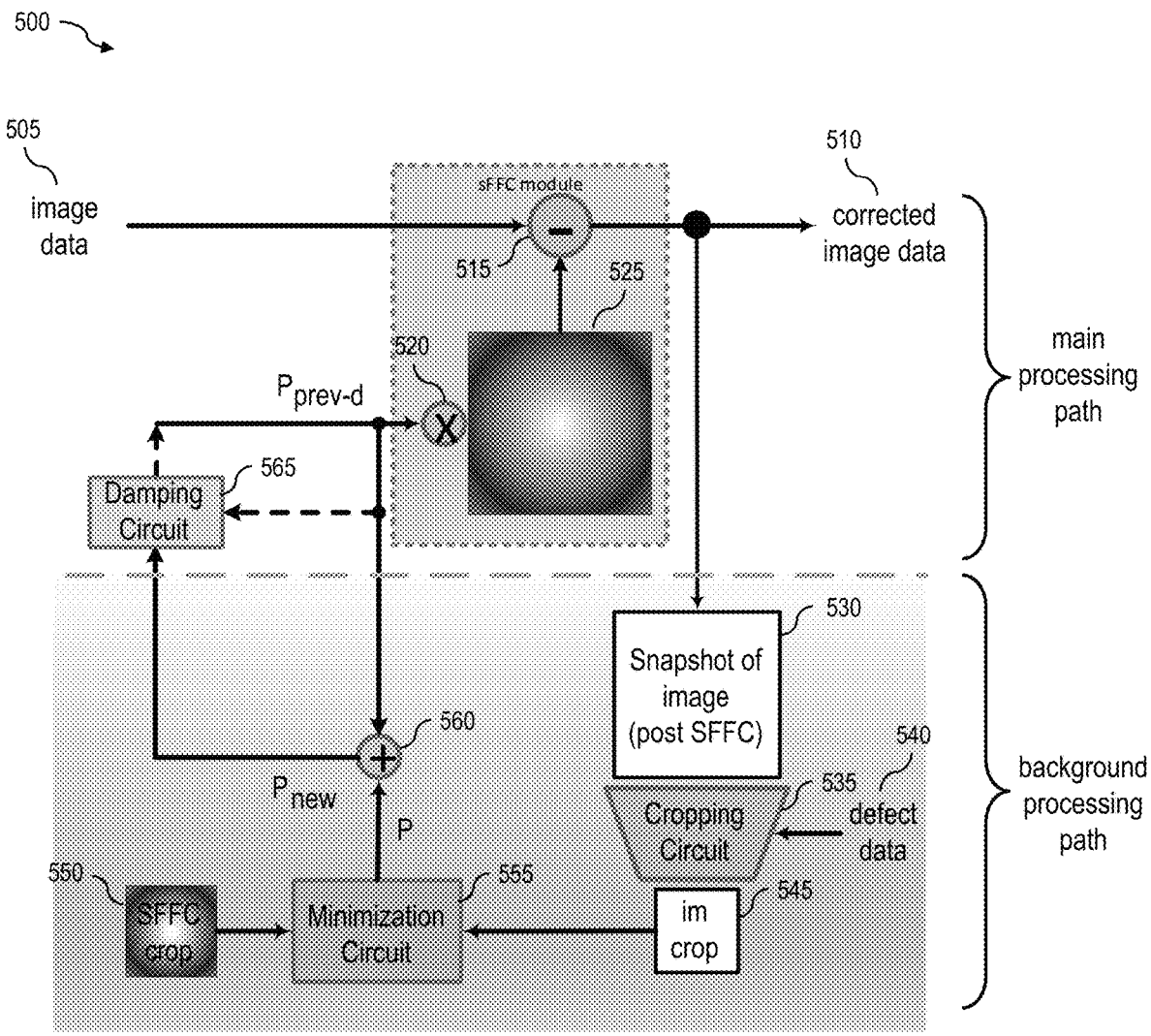

In some embodiments, a snapshot may be obtained after non-estimation correction is performed. FIG. 5 illustrates an example system 500 for facilitating image non-uniformity mitigation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of the system 400 of FIG. 4 generally applies to the system 500 of FIG. 5, with examples of differences and other description provided herein.

In the system 500, a main processing path involves performing non-uniformity correction on image data 505 to obtain corrected image data 510 (e.g., non-uniformity corrected image data). The image data 505 and the corrected image data 510 may each include images. In some cases, the image data 505 may include images to which gain and/or offset have been applied.

In the main processing path, a combiner circuit 515 receives the image data 505 and applies a scaled SFFC map to the image data 505 to obtain the corrected image data 510. The combiner circuit 515 may subtract the scaled SFFC map from images of the image data 505 to obtain images of the corrected image data 510. A combiner circuit 520 applies a previous damped scaling term $P_{prev-d}$ to an SFFC map 525 to obtain the scaled SFFC map. The previous damped value $P_{prev-d}$ may be a previous value $P_{prev}$ of the scaling term that has been damped by a damping circuit 565. The previous value $P_{prev}$ of the scaling term may be a value determined by a minimization circuit 555 to minimize a cost function for a previous snapshot (e.g., a snapshot from a prior time instance from the image 530) taken from the image data 505.

An image 530 of the corrected image data 510 may be provided (e.g., as a snapshot of the corrected image data 510) to a background processing path. A cropping circuit 535 receives the image 530 and crops the image 530 based on defect data 540 to obtain a cropped image 545. The defect data 540 may include data indicative of a location, a size, and/or other data pertaining to a defect in the image 530. A portion of the SFFC map 525 that corresponds (e.g., in size, location, and shape) to the cropped image 545 is cropped out to provide a cropped SFFC map 550. The cropped image 545 and the cropped SFFC map 550 may be of other sizes and/or shapes (e.g., non-rectangular maps/images).

A minimization circuit 555 receives the cropped image 545 and the cropped SFFC map 550 and iteratively adjusts a scalar value P to minimize a cost function FVAL(P). In an embodiment, the cost function may be provided by:

$$FVAL(P) = \text{mean } \left(\sqrt[2]{grad(im_{cropped} - P \times NU)}\right)^2$$

where $im_{cropped}$ is the cropped image 545 and NU (e.g., a non-uniformity estimate) is the cropped SFFC map 550.

A combiner circuit 560 receives and combines the scaling term P from the minimization circuit 555 and the previous damped value $P_{prev-d}$ of the scalar term to obtain a new value $P_{new}$ of the scalar term. The combiner circuit 560 may add the previous damped value $P_{prev-d}$ to the value P from the minimization circuit 555 to obtain the new value $P_{new}$ of the scaling term. The damping circuit 565 receives the values $P_{new}$ and $P_{prev-d}$ of the scaling term to generate a damped new value $P_{new-d}$ (not explicitly labeled in FIG. 5). This damped new value $P_{new-d}$ may be provided to the combiner circuit 520 to scale the SFFC map 525 for correcting an image of the image data 505. The damped new value $P_{new-d}$ may be provided to the damping circuit 565 and the combiner circuit 560. The damped new value $P_{new-d}$ may be applied to images subsequent to the image 530. It is noted that in the system 400 of FIG. 4 the value P from the minimization circuit 445 is dampened and used to scale the SFFC map 435, whereas in the system 500 of FIG. 5 the value P from the minimization circuit 555 is not directly dampened and used to scale the SFFC map 525.

Figure 6:
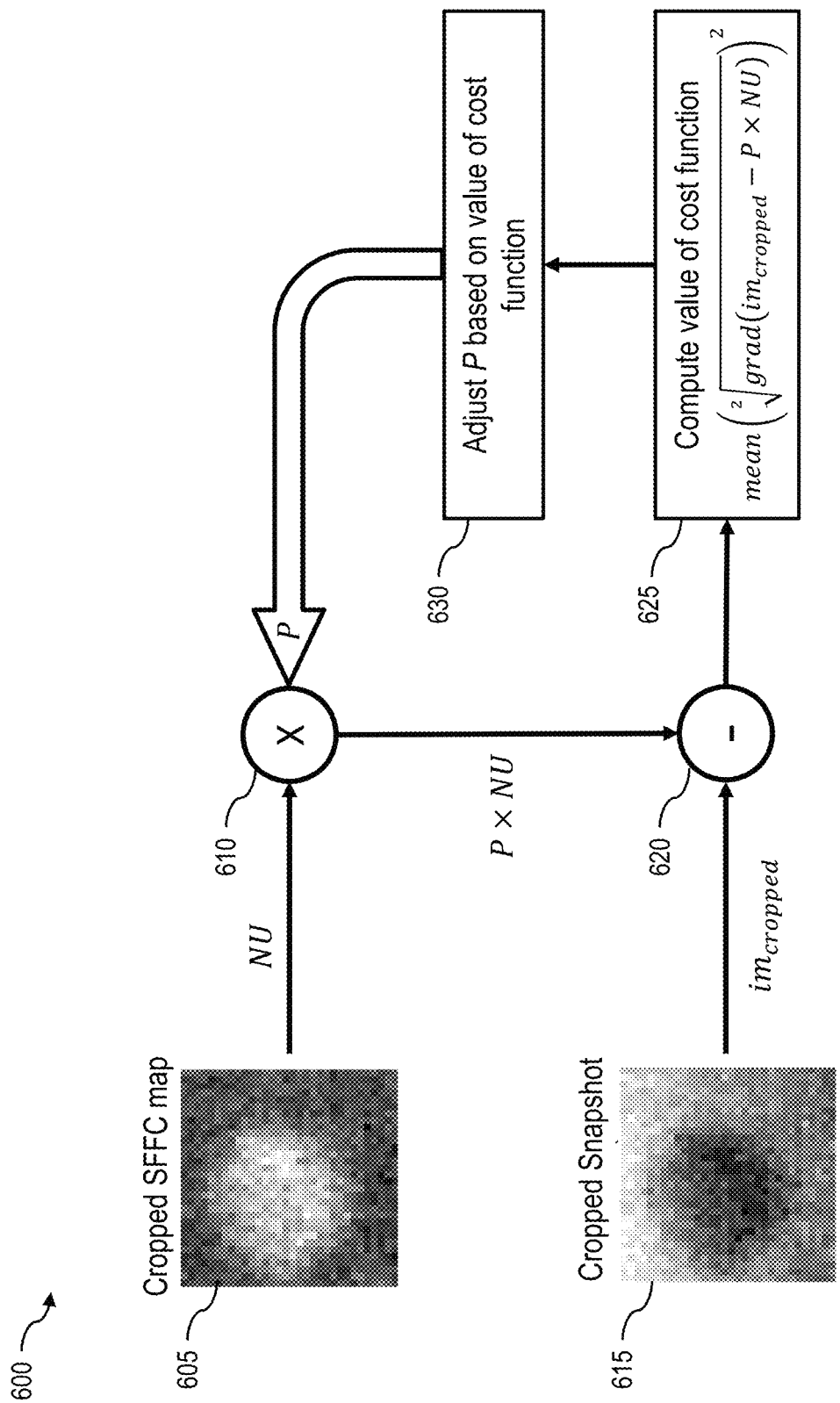
FIG. 6 illustrates an example system for iteratively adjusting a scalar value to minimize a cost function in accordance with one or more embodiments of the present disclosure.

FIG. 6 illustrates an example system 600 for iteratively adjusting a scalar value P to minimize a cost function FVAL(P) in accordance with one or more embodiments of the present disclosure. Although the system 600 is primarily described herein with reference to the imaging system 100 of FIG. 1 and the example cost function described with respect to FIGS. 4 and 5, the system 600 can be performed in relation to other systems and/or other cost functions.

A cropped SFFC map 605 (denoted as NU) and a scaling term P are provided to a combiner circuit 610. The combiner circuit 610 may multiply the cropped SFFC map 605 with the scaling term P to obtain a scaled cropped SFFC map (denoted as P×NU). A cropped image 615 (denoted as $im_{cropped}$) and the scaled cropped SFFC map are provided to a combiner circuit 620. The cropped SFFC map 605, the scaled cropped SFFC map, and the cropped image 615 are the same size. As non-limiting examples, the cropped SFFC map 605, the scaled cropped SFFC map, and the cropped image 615 may be 32 pixels×32 pixels, 64 pixels×64 pixels, 32 pixels×64 pixels, or other size. The cropped SFFC map 605, the scaled cropped SFFC map, and the cropped image 615 may be of other sizes and/or shapes (e.g., non-rectangular maps/images). The combiner circuit 620 may subtract the scaled cropped SFFC map from the cropped SFFC map 605 to obtain $im_{cropped}$–P×NU. The $im_{cropped}$–P×NU may be referred to as a corrected image (e.g., also referred to as corrected cropped image or corrected image portion) and is formed by subtracting the scaled cropped SFFC map from the cropped image 615.

A cost function computation circuit 625 computes a value of a cost function using $im_{cropped}$–P×NU. In an embodiment, the cost function may be provided by:

$$FVAL(P) = \text{mean } \left(\sqrt[2]{grad(im_{cropped} - P \times NU)}\right)^2$$

A scalar value adjustment circuit 630 receives a value FVAL(P) from the cost function computation circuit 625 and adjusts the scaling term P. Such an adjustment is to provide a value of P that reduces the cost function FVAL(P). The adjusted scalar value is provided by the scalar value adjustment circuit 630 to the combiner circuit 610. The system 600 may then be performed again to repeatedly adjust P to converge toward a value of P that minimizes the cost function FVAL(P). Under this iterative approach, the non-uniformity estimate portion NU is fixed whereas the scalar value P is iteratively updated.

Figure 7:
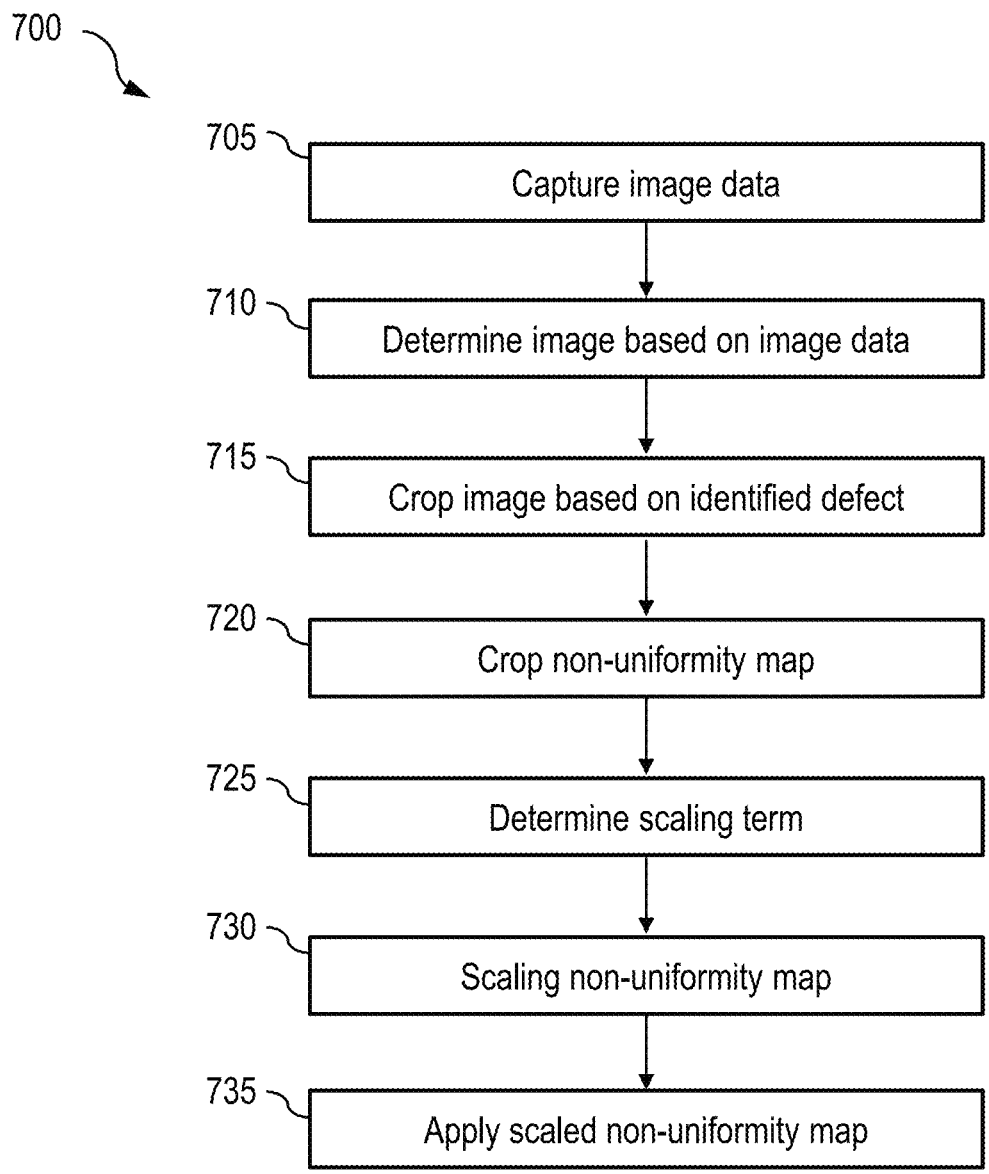
FIG. 7 illustrates a flow diagram of an example process for facilitating image non-uniformity mitigation in accordance with one or more embodiments of the present disclosure.

FIG. 7 illustrates a flow diagram of an example process 700 for facilitating image non-uniformity mitigation in accordance with one or more embodiments of the present disclosure. Although the process 700 is primarily described herein with reference to the systems 100, 400, and 500 of FIGS. 1, 4, and 5 for explanatory purposes, the process 700 can be performed in relation to other systems for image non-uniformity mitigation. Note that one or more operations in FIG. 7 may be combined, omitted, and/or performed in a different order as desired.

At block 705, the image detector circuit 165 captures image data (e.g., thermal image data) in response to radiation (e.g., infrared radiation) received by the image detector circuit 165. In this regard, to reach the image detector circuit 165, the radiation may propagate through an optical path of the imaging system 100 to be received by the image detector circuit 165. In some cases, the image detector circuit 165 and/or circuitry coupled to the image detector circuit 165 may convert the radiation into electrical signals (e.g., voltages, currents, etc.) and generate pixel values based on the electrical signals. In an aspect, the pixel values generated by the image detector circuit 165 and/or associated circuitry may be represented in terms of digital count values generated based on the electrical signals obtained from converting the detected infrared radiation. For example, in a case that the image detector circuit 165 includes or is otherwise coupled to an ADC circuit, the ADC circuit may generate digital count values based on the electrical signals. For an ADC circuit that can represent an electrical signal using 14 bits, the digital count value may range from 0 to 16,383.

At block 710, the processing component 105 determines an image based on the image data. In an aspect, the processing component 105 may apply gain and/or offset on the image data to obtain the image. In some cases, the processing component 105 may receive the image data via the image interface 120. As one example, the image data may be received from the image capture component 115. As another example, the image data may be received or retrieved from an image capture component external from the imaging system 100 and/or a memory of the imaging system 100 or other system that stores captured image data.

At block 715, the processing component 105 crops the image based on a defect identified in the image to obtain a cropped image. In an aspect, a defect may be determined/identified by a user of the imaging system 100 (e.g., via visual inspection by the human eye) and/or a machine. For example, the user may provide an input to the processing component 105 to indicate a location of the defect in the image (e.g., pixels in the image that encompass the image). In some cases, the defect may be a worst defect in the image. In some cases, if the image does not have a defect, any location in the image may lead to the processing component 105 to compute a scaling term of zero. For example, the user may select any location in the image to perform the cropping and, subsequently, determine a scaling term P. The end result of the minimization process leads to a zero scaling term since the cropped image has no defect. With the scaling term P at zero, a non-uniformity correction is set to zero and the image is not adversely affected by performing the process 700. At block 720, the processing component 105 crops a non-uniformity map (e.g., SFFC map) according to the cropped image to obtain a cropped non-uniformity map. The non-uniformity map may be cropped at a location corresponding to a location of the defect in the image. The cropped non-uniformity map is associated with the same size, shape, and location as the cropped image.

At block 725, the processing component 105 determines a value of a scaling term P based on a cost function. In an aspect, the processing component 105 may perform minimization to determine the value of the scaling term P that minimizes a cost function. A value of the cost function may be based on the scaling term P and a variation among pixel values of a corrected image after the cropped non-uniformity estimate has been applied to the cropped image. In an aspect, a value of the cost function may be associated with a quality of the image after non-uniformity correction. In one embodiment, the cost function FVAL(P) may be provided by:

$$FVAL(P) = \text{mean} \left( \sqrt[2]{grad(im_{cropped} - P \times NU)} \right)^2$$

At block 730, the processing component 105 scales the non-uniformity map based on the scaling term P to obtain a scaled non-uniformity map. In an aspect, the non-uniformity map may be multiplied by the scaling term P. In an aspect, such as in the system 400, the scaling term P is dampened to obtain a damped scaling term $P_{damp}$ and the damped scaling term $P_{damp}$ applied directly to the non-uniformity map. For example, the non-uniformity map is multiplied (e.g., scaled) by the scaling term P to obtain a scaled non-uniformity map. In an aspect, such as in the system 500, the scaling term P may be adjusted based on a previous scaling term $P_{prev}$ to obtain a new scaling term $P_{new}$. The new scaling term $P_{new}$ may be applied to the non-uniformity map, or the new scaling term $P_{new}$ may be dampened and then applied to the non-uniformity map.

At block 735, the processing component 105 applies the scaled non-uniformity map to one or more images to obtain one or more non-uniformity corrected images. In some cases, the scaled non-uniformity map is applied to image data captured subsequent to the image data captured at block 705. In some cases, the scaled non-uniformity map is applied to the image determined at block 710. In an aspect, the non-uniformity corrected image(s) may be further processed (e.g., subsequent processing in a main processing path such as temporal and/or spatial filtering, radiometric conversion operations for infrared images, and so forth), stored, and/or displayed. In some embodiments, the scaling term may be determined per frame (e.g., in real time) in the main processing path rather than as a background process. In some cases, subsequent or prior to non-uniformity correction based on the scaling term P, a low-frequency shading reduction may be performed (e.g., to mitigate large scale shading correction from out of field irradiance).

Although the systems 400, 500, and 700 are primarily described in a situation in which image data is captured and non-uniformity correction performed (e.g., the scaling term P is generated for a snapshot in around real-time as the image data is captured, the systems 400, 500, and 700 may generate the scaling term P and/or perform non-uniformity correction for image data and/or images previously captured/generated (e.g., by any imaging system having appropriate capabilities) and stored. The stored image data and/or images (e.g., stored snapshots and/or video clips) and associated data may then be accessed/retrieved for processing at a later point in time. The associated data may include metadata provided in headers appended to the image data and/or images and/or otherwise stored with appropriate indication of the data's association with the image data and/or images. For example, the metadata may include operating conditions, such as an operating temperature of the imaging system 100 when the image data was captured, date and time the image data was captured, and/or other data.

Figure 8A:
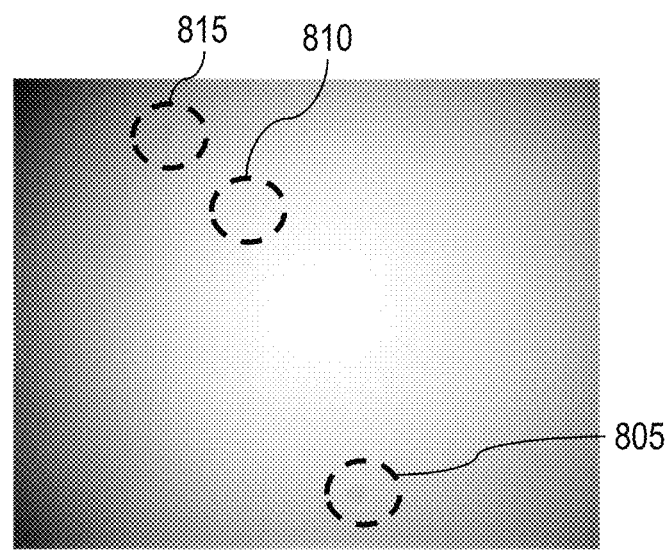
FIG. 8A illustrates an image having defects.
Figure 8B:
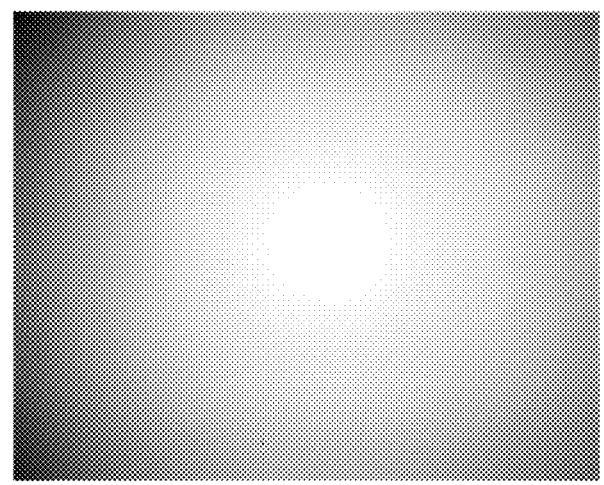
FIG. 8B illustrates an image obtained by performing non-uniformity mitigation on the image of FIG. 8A in accordance of one or more embodiments of the present disclosure.

FIG. 8A illustrates an image having defects (encompassed by dotted ovals 805, 810, and 815 and also referred to as defects 805, 810, and 815). FIG. 8B illustrates an image obtained by performing non-uniformity mitigation on the image of FIG. 8A in accordance of one or more embodiments of the present disclosure. In one case, the non-uniformity mitigation is based on cropping the image at a location of the defect 805 (e.g., the defect 805 is considered a worst defect), cropping a corresponding portion of the SFFC map, determining a scaling term using a cost function, and so forth, in accordance with one or more embodiments. The scaling term determined based on the defect 805 provides non-uniformity estimation applicable on the image of FIG. 8A to mitigate the defect 805 as well as the defects 810 and 815. In some cases, low-frequency shading reduction may be performed to remove the shading at the corners of the images of FIGS. 8A and 8B.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising
cropping a first image based on a location of a defect in the first image to obtain a first cropped image;
cropping a supplemental flat field correction (SFFC) map based on the location of the defect in the first image to obtain a first cropped SFFC map;
determining a first scaling value of a scaling term based at least on a cost function, the first cropped image, and the first cropped SFFC map; and
scaling the SFFC map based on the first scaling value to obtain a first scaled SFFC map.

2. The method of claim 1, further comprising applying the scaled SFFC map to one or more images, wherein the cropping the first image and the cropping the SFFC map are further based on a size of the defect.

3. The method of claim 2, wherein the one or more images comprises the first image.

4. The method of claim 1, further comprising:
capturing, by a focal plane array, image data, wherein the focal plane array comprises a plurality of infrared detectors; and
processing the image data to obtain the first image, wherein the processing comprises applying a gain and/or an offset to the image data.

5. The method of claim 1, further comprising applying a damping factor to the first scaling value to obtain a damped scaling value, wherein the scaling is based on the damped scaling value.

6. The method of claim 1, wherein the determining the first scaling value comprises iteratively adjusting a value of the scaling term to obtain the first scaling value that minimizes the cost function.

7. The method of claim 1, wherein the cost function is based on the first cropped image, a value of the scaling term, and the first cropped SFFC map.

8. The method of claim 7, wherein the cost function is based on a gradient of a difference between the first cropped image and the first cropped SFFC map scaled by the value of the scaling term.

9. The method of claim 1, further comprising:
cropping a second image based on a defect in the second image to obtain a second cropped image;
cropping the SFFC map based on the defect in the second image to obtain a second cropped SFFC map;
determining a second scaling value of the scaling term based at least on the cost function, the second cropped image, and the second cropped SFFC map; and
scaling the SFFC map based at least on the second scaling value to obtain a second scaled SFFC map.

10. The method of claim 9, wherein the second scaled SFFC map is further based on the first scaling value.

11. The method of claim 1, wherein the first image comprises a thermal image.

12. A system comprising:
a memory configured to store a supplemental flat field correction (SFFC) map; and
a processing circuit configured to:
crop a first image based on a location of a defect in the first image to obtain a first cropped image;
crop the SFFC map based on the location of the defect in the first image to obtain a first cropped SFFC map;
determine a first scaling value of a scaling term based at least on a cost function, the first cropped image, and the first cropped SFFC map; and
scale the SFFC map based on the first scaling value to obtain a first scaled SFFC map.

13. The system of claim 12, wherein the processing circuit is further configured to apply the first scaled SFFC map to one or more images.

14. The system of claim 12, wherein the processing circuit is further configured to apply a damping factor to the first scaling value to obtain a damped scaling value, and wherein the processing circuit is configured to scale the SFFC map based on the damped scaling value.

15. The system of claim 12, further comprising a focal plane array configured to capture thermal image data, wherein the processing circuit is further configured to apply a gain and/or an offset to the thermal image data to obtain the first image.

16. The system of claim 15, wherein the focal plane array comprises a plurality of microbolometers.

17. The system of claim 12, wherein the processing circuit is configured to determine the first scaling value by iteratively adjusting a value of the scaling term to obtain the first scaling value that minimizes the cost function.

18. The system of claim 12, wherein the cost function is based on the first cropped image, a value of the scaling term, and the first cropped SFFC map.

19. The system of claim 12, wherein the processing circuit is further configured to:
crop a second image based on a defect in the second image to obtain a second cropped image;
crop the SFFC map based on the defect in the second image to obtain a second cropped SFFC map;
determine a second scaling value of the scaling term based at least on the cost function, the second cropped image, and the second cropped SFFC map; and
scale the SFFC map based at least on the second scaling value to obtain a second scaled SFFC map, wherein the second scaled SFFC map is further based on the first scaling value.

20. The method of claim 1, wherein the first cropped SFFC map is associated with the same size, shape, and location as the first cropped image.

* * * * *